C. E. JEWELL.
TIME CONTROLLED THERMOSTAT.
APPLICATION FILED FEB. 18, 1914.

1,154,926.

Patented Sept. 28, 1915.

INVENTOR
Charles E. Jewell,
BY
Arthur M. Hood
ATTORNEY

WITNESSES:
Frank A. Sahle
Josephine Gasper

UNITED STATES PATENT OFFICE.

CHARLES E. JEWELL, OF AUBURN, NEW YORK, ASSIGNOR TO THE HONEYWELL HEATING SPECIALTY COMPANY, OF WABASH, INDIANA, A CORPORATION OF INDIANA.

TIME-CONTROLLED THERMOSTAT.

1,154,926.  Specification of Letters Patent.  Patented Sept. 28, 1915.

Application filed February 18, 1914. Serial No. 819,563.

*To all whom it may concern:*

Be it known that I, CHARLES E. JEWELL, a citizen of the United States, residing at Auburn, in the county of Cayuga and State of New York, have invented a new and useful Time-Controlled Thermostat, of which the following is a specification.

The object of my invention is to produce an apparatus for the thermostatic control of temperature-affecting members, such, for instance, as a furnace, of such character that the thermostatic member will differently affect the temperature-controlling member at different times, the thermostatic member being automatically returned to initial position and condition at stated intervals whereby in ordinary residences for instance a lower temperature may be selected as the normal temperature for the night hours and a higher temperature selected for the normal temperature during the day hours.

The accompanying drawings illustrate my invention.

Figure 1:
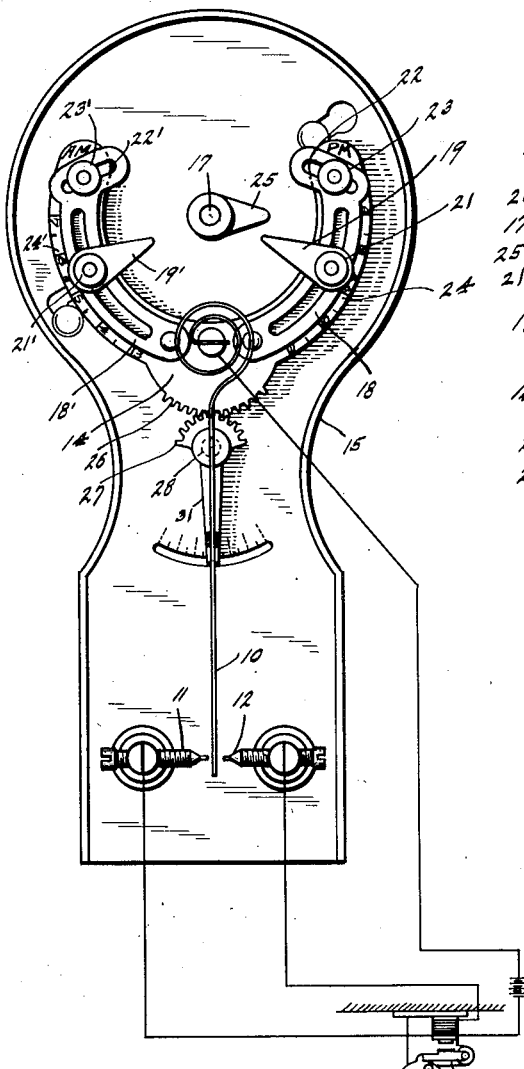
Figure 2:
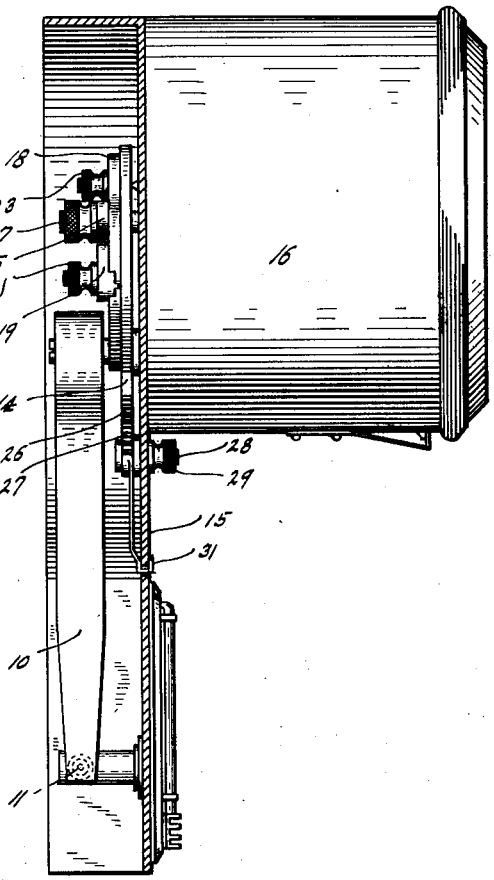

Figure 1 is an elevation of an apparatus embodying my invention, said figure also embodying a diagram of the common wiring and a common form of mechanism for controlling the temperature affecting member; Fig. 2 is a central vertical section of the structure shown in Fig. 1.

In the drawings, 10 indicates a thermostatic element arranged to play between two terminals 11 and 12, said terminals being connected in a common manner with a damper motor 13 of any desired type. The thermostatic element 10 is carried by a swinging yoke 14 which is conveniently pivoted upon the back of a casing 15 which forms a convenient support for a time train 16, said time train embodying an arbor 17 connected with the time train in such manner and preferably as to rotate once in twenty-four hours (or once in a complete desired time scale). Pivoted upon one arm of yoke 14 is a slotted arm 18 substantially concentric with the axis of arbor 17 and in the slot of this arm is adjustably mounted a finger 19 which may be held in any desired position of adjustment longitudinally of the arm 18 by a clamping nut 21. The free end of arm 18 is transversely slotted at 22 and a clamping nut 23 provided so that the free end of arm 18 may be swung toward and from the axis of arbor 17. Adjacent the arm 18 the yoke 14 is provided with a scale 24 marked off in hours to indicate the arrangement of the finger 19 relative to a finger 25 carried by arbor 17 the scale indicating the time at which finger 25 comes into maximum contact with the finger 19. Similarly arm 18' is carried by the opposite arm of the yoke 14 and this arm carries a finger 19' held in any desired adjusted position by a clamping nut 21. Arm 18' is transversely slotted at 22' and held in place by the clamping nut 23' and a scale 24' which is on the yoke 14 adjacent the arm 18' indicates the position of finger 19' relative to the maximum contacting of finger 25 therewith. In order to permit the ready adjustment by hand of the thermostatic member the yoke 14 is provided with a segmental rack 26 meshing with a segmental rack 27 carried by a shaft 28 journaled in the casing 15, and provided at its outer end with an operating head 29. Shaft 28 may conveniently carry an indicator finger 31 which is projected through the face plate of the casing 15 so as to be readily visible.

Supposing the contact points 11 and 12 to be so set that with yoke 14 in its middle position, the thermostatic element 10 at 68° will lie between the two terminals without contacting with either and supposing the user of the apparatus desires a normal temperature of 50° during the hours from 8:30 p. m. until 5:30 a. m. and a normal temperature of 70° during the remainder of the twenty-four hours. Thereupon the finger 19 will be adjusted to approximately the position shown in Fig. 1 and arm 18 will be swung upon its pivot so as to bring the inner end of arm 19 sufficiently within the path of movement of the outer end of arm 25 that, when said arm comes in contact with the finger 19, the thermostatic element as a whole will be turned upon its pivot by the cam action of the parts 25 and 19 so as to swing its free end over against terminal 11 and flex the thermostatic element sufficiently to cause said thermostatic element to remain in contact with the terminal 11 until the room temperature has dropped to 50°. Finger 25 will continue in its movement and will soon pass finger 19, but the thermostatic element will not have sufficient strength in itself to return the yoke 14 to its normal position, although the user may at any time by hand manipulation of the shaft 28 readily return the parts to normal position or put them in any desired position. The user will also adjust finger 19' to approximately the position shown in Fig. 1 and, by swinging the arm 18', adjust the inner end of the finger 19' relative to the path of movement of the outer end of finger 25 so that, when said finger 25 contacts the finger 19', and at 5:30 a. m. reaches its maximum contact, the yoke 14 will have been swung back so as to withdraw the element 10 from contact with terminal 11 and bring it into contact with terminal 12, this action causing an opening of the parts of the furnace 50 in a well known manner through the damper motor 13, and this movement of the yoke 14 will establish the thermostatic element in such position that, when the desired temperature of say 70° is reached, the thermostatic element 10 will automatically withdraw from terminal 12 and, upon a slight rise of temperature, will contact with terminal 11 so as to cause a checking of the fire in the furnace 50. The contacting ends of the fingers 19, 19' and 25 may, of course, be made of any desired angular extent but I prefer to have them of comparatively limited extent, thus gaining their maximum coöperative effect as quickly as possible and also leaving the apparatus entirely free for manual manipulation except through the very limited periods when the finger 25 is in contact with one or the other of the fingers 19 and 19'.

I claim as my invention:

1. In a time-controlled thermostat, the combination with a thermostatic member, of a shiftable carrier therefor, a time-train, an operating member carried by said time-train through a cycle, and members associated with said carrier to be alternately engaged by said operating member to shift the carrier from one normal position to another and return, but free from contact therewith between such points of engagement whereby the carrier may be manually adjusted.

2. In a time-controlled thermostat, the combination of a time-train, an operating member rotated thereby, a thermostatic member, a carrier for said thermostatic member provided with a pair of arms arranged upon opposite sides of the axis of the operating member and provided with portions arranged to be alternately engaged by the operating member to shift the carrier from one normal position to another and return, said portions being free from contact with the operating member between such points of engagement whereby the carrier may be manually adjusted.

3. In a time-controlled thermostat, the combination of a time-train, an operating member rotated thereby, a thermostatic member, a carrier for said thermostatic member provided with a yoke arranged upon opposite sides of the axis of the operating member; two arms one mounted on each portion of the yoke, and a finger mounted on each arm, one of said members being adjustable toward and from the axis of the operating member and the other adjustable angularly around the said axis, one of the members of each pair arranged to be engaged by the operating member to shift the carrier from one normal position to another and return.

4. In a time-controlled thermostat, the combination of a time-train, an operating member rotated thereby, a movable yoke extended upon opposite sides of said operating member, and two members for alternate engagement by the operating member, each mounted upon an arm of the yoke and adjustable laterally and angularly relative to the operating member, and a thermostatic element carried by said yoke.

5. In a time-controlled thermostat, the combination of a time-train, an operating member movable by said time-train through a cycle, a shiftable carrier, two arms carried by said carrier in the path of said operating member to be operated thereby to shift said carrier in opposite directions respectively, said arms and said operating member being relatively adjustable to vary both the time and the extent of their engagement, and a thermostatic element and a coöperating contact one of which is mounted on said carrier so that the temperature at which said thermostatic element and contact engage and disengage is varied by the shifting of said carrier.

6. In a time-controlled thermostat, the combination of a time-train, an operating member movable by said time-train through a cycle, a shiftable carrier, two arms carried by said carrier in the path of said operating member to be operated thereby to shift said carrier in opposite directions respectively, said arms and said operating member being relatively adjustable to vary the time of their engagement, and a thermostatic element and a coöperating contact one of which is mounted on said carrier so that the temperature at which said thermostatic element and contact engage and disengage is varied by the shifting of said carrier.

7. In a time-controlled thermostat, the combination of a time-train, an operating member movable by said time-train through a cycle, a shiftable carrier, two arms carried by said carrier in the path of said operating member to be operated thereby to shift said carrier in opposite directions respectively, said arms and said operating member being relatively adjustable to vary the extent of their engagement, and a thermostatic element and a coöperating contact one of which is mounted on said carrier so that the temperature at which said thermostatic element and contact engage and disengage is varied by the shifting of said carrier.

8. In a time-controlled thermostat, the combination of a time-train, an operating member movable by said time-train through a cycle, a shiftable carrier, two arms carried by said carrier in the path of said operating member to be operated thereby to shift said carrier in opposite directions respectively but free from contact therewith between such points of engagement whereby the carrier may be manually adjusted, and a thermostatic element and a coöperating contact one of which is mounted on said carrier so that the temperature at which said thermostatic element and contact engage and disengage is varied by the shifting of said carrier.

9. In a time-controlled thermostat, the combination of a time-train, an operating cam movable by said time-train through a cycle, a shiftable carrier, two cam members carried by said carrier in the path of said operating cam, said carrier being mounted so that when said cam members are engaged by said operating cam they are moved transversely to the path of the operating cam to shift the carrier in opposite directions respectively, said cam members being adjustable to vary both the time of and the amount of transverse movement produced by their engagement with said operating cam, and a thermostatic element and a coöperating contact one of which is mounted on said carrier so that the temperature at which said thermostatic element and contact engage and disengage is varied by the shifting of said carrier.

10. In a time-controlled thermostat, the combination of a time-train, an operating cam movable by said time-train through a cycle, a shiftable carrier, two cam members carried by said carrier in the path of said operating cam, said carrier being mounted so that when said cam members are engaged by said operating cam they are moved transversely to the path of the operating cam to shift the carrier in opposite directions respectively, said cam members being adjustable to vary the time of their engagement with said operating cam, and a thermostatic element and a coöperating contact one of which is mounted on said carrier so that the temperature at which said thermostatic element and contact engage and disengage is varied by the shifting of said carrier.

11. In a time-controlled thermostat, the combination of a time-train, an operating cam movable by said time-train through a cycle, a shiftable carrier, two cam members carried by said carrier in the path of said operating cam, said carrier being mounted so that when said cam members are engaged by said operating cam they are moved transversely to the path of the operating cam to shift the carrier in opposite directions respectively, said cam members being adjustable to vary the amount of transverse movement produced by their engagement with said operating cam, and a thermostatic element and a coöperating contact one of which is mounted on said carrier so that the temperature at which said thermostatic element and contact engage and disengage is varied by the shifting of said carrier.

12. In a time-controlled thermostat, the combination of a time-train, an operating cam movable by said time-train through a cycle, a shiftable carrier, two cam members carried by said carrier in the path of said operating cam, said carrier being mounted so that when said cam members are engaged by said operating cam they are moved transversely to the path of the operating cam to shift the carrier in opposite directions respectively, and also such that, when free from engagement by the operating cam, the carrier may be manually adjusted, and a thermostatic element and a coöperating contact one of which is mounted on said carrier so that the temperature at which said thermostatic element and contact engage and disengage is varied by the shifting of said carrier.

In witness whereof, I have hereunto set my hand at Auburn, New York, this 13th day of February, A. D. one thousand nine hundred and fourteen.

CHARLES E. JEWELL.

Witnesses:
H. B. Fay,
C. M. Blodgett.